United States Patent [19]

Lee et al.

[11] 4,376,100

[45] Mar. 8, 1983

[54] LITHIUM HALIDE BRINE PURIFICATION

[75] Inventors: John M. Lee; William C. Bauman, both of Lake Jackson, Tex.

[73] Assignee: The Dow Chemical Company, Midland, Mich.

[21] Appl. No.: 324,300

[22] Filed: Nov. 23, 1981

[51] Int. Cl.³ .............................................. C01D 15/00
[52] U.S. Cl. ................................................... 423/179.5
[58] Field of Search ...................................... 423/179.5

[56] References Cited

U.S. PATENT DOCUMENTS 4,291,001 9/1981 Repsher et al. .................. 423/179.5

Primary Examiner—O. R. Vertiz
Assistant Examiner—Wayne A. Langel
Attorney, Agent, or Firm—W. J. Lee

[57] ABSTRACT

A resin/aluminate composite which has been substantially loaded with Li+ values by being contacted with a contaminated, Li+-containing aqueous solution, is prewashed with a substantially pure, concentrated NaCl brine to remove the contaminants without removing the Li+ values, then is washed with water to leach out much, but not all, of the Li+ values. The resin/aluminate composite comprises a macroporous anion exchange resin having crystalline $LiX \cdot 2Al(OH)_3$ dispersed therein, where X is halide.

13 Claims, No Drawings

LITHIUM HALIDE BRINE PURIFICATION

CROSS-REFERENCE TO RELATED APPLICATION

Our co-pending application Serial No. 095,691 filed Nov. 19, 1979 discloses a method for maximizing the amount of hydrous alumina compounds incorporated into an ion exchange resin. The hydrous alumina is converted to crystalline $LiX.2Al(OH)_3$, where X is halide (esp. $Cl^-$), and the so-formed composite is useful in selectively removing $Li^+$ values from brines in a manner such as shown in our U.S. pat. Nos. 4,116,856; 4,116,858; and 4,159,311.

BACKGROUND OF THE INVENTION

U.S. Pat. Nos. 4,116,856; 4,116,858; and 4,159,311 disclose preparation of, and uses of, ion exchange resins having incorporated therein crystalline $LiX.2Al(OH)_3$, where X is halide, especially chloride. Our co-pending Ser. No. 095,691 filed Nov. 19, 1979 discloses a method for maximizing the amount of these crystalline lithium halide aluminates in the exchange resins. These patents and our co-pending Ser. No. 095,961 are incorporated herein by reference.

The present invention pertains to the obtaining of high purity lithium halide solutions from the use of such resin/aluminate composites. When these composites have been employed to absorb $Li^+$ ions from brines by having the $Li^+$ taken up into the aluminate crystals, there still remains in the interstices of the composite some of the brine from which the $Li^+$ ions have been absorbed. When the brine contains other metal ions (i.e., other than alkali metal ions) such as alkaline earth metal ions, then when an aqueous wash is employed to elute desired $Li^+$ ions from the crystals, the effluent also contains these other metal ions which were in the interstices but which were not in the crystal structure.

It has now been found that the use of a concentrated pure Na halide brine washing step before the water-washing step used for $Li^+$ leaching, results in washing out the metal ions (such as alkaline earth metal ions) without leaching out a significant amount of the $Li^+$ in the aluminate crystals. Then when water is employed to leach out the $Li^+$ in the aluminate crystals, the only other metal ions present in any appreciable amount in the effluent are those of the Na halide brine.

SUMMARY OF THE INVENTION

Concentrated relatively pure, Na halide brine is used as a pre-wash before the water-leaching of $Li^+$ values from a composite comprising an ion exchange resin having incorporated therein a crystalline lithium halide aluminate composition. Thus the Na halide which is washed from the interstices of the composite by the water-leaching is mostly present in the initial portions of the effluent and in decreasing amounts in the subsequent portions of lithium halide solution. Thus there is obtained a lithium halide solution which contains only Na halide as an impurity in significant amount.

DETAILED DESCRIPTION

The presently used "resin/aluminate composites", prepared by incorporating crystalline $LiX.2Al(OH)_3$ (where X is halide) into ion exchange resins, are as shown in the references listed supra, especially the heavily loaded resins of our Ser. No. 095,691.

As used herein, the "halide" of the expression "Na halide" or "LiX" refers to Cl, Br, or I, with Cl being preferred. For simplicity in this disclosure the "halide" will be shown as the preferred chloride, with the understanding that bromide or iodide is also suitable.

The relatively pure Na halide brine, hereinafter referred to as NaCl brine for purposes of conciseness, may also be taken to mean an "alkali metal halide brine" other than lithium halide brine, though a small amount of $Li^+$ in the NaCl brine is beneficial. It is this relatively pure, but concentrated, NaCl brine which is used as the pre-wash for the lithium-loaded resin/aluminate composite before the water-leaching step; the water-leaching step is done to remove much of the $Li^+$ values from the composite (but not all of the $Li^+$ values), thereby substantially "unloading" the composite. This concentrated NaCl brine is preferably at or near saturation, but any concentration above about 20% should provide a reasonably efficient operation. At further reduced concentrations the operation becomes less and less efficient. From a practical standpoint to achieve an economical and efficient operation, the concentration is preferably about 24% to about 26%.

The $Li^+$-containing aqueous solution or brine solution from which $Li^+$ ions are desirably removed are those which are contaminated with metal ions other than $Li^+$ or alkali metal ions. These other metal ions are usually alkaline earth metal ions, such as $Mg^{++}$, $Ca^{++}$ etc., but may also be virtually any other non-alkali metal cation.

The $Li^+$-loaded resin/aluminate composites, having in the interstices thereof any contaminating metal cations other than alkali metal cations, would ordinarily be derived from a process wherein a substantially "unloaded" composite is used to absorb or take-up $Li^+$ ions from an impure brine, thereby becoming "loaded" with $Li^+$ ions. Obviously, though, any such $Li^+$-loaded resin/aluminate having the "other" metal cations in the interstices thereof may be used in the present process. The purpose and intent of the present process is to remove the contaminating metal cations from the interstices without removing a significant amount of the $Li^+$ ions; this is done by using a relatively pure, preferably concentrated NaCl pre-wash which leaves the $Li^+$ ions in place, but which leaves the interstices filled with the relatively pure NaCl brine which is essentially devoid of the said contaminating metal cations.

Then when a water-leaching is used to remove $Li^+$ from the composite, the initial portions of effluent wash out much of the NaCl and some of the $Li^+$; subsequent portions comprise substantially pure Li solutions having NaCl as virtually the only contaminant. As stated in the references identified supra, it is best that not all the $Li^+$ be removed from the crystalline $LiX.2Al(OH)_3$ because removal of all the $Li^+$ can cause collapse or destruction of the crystalline aluminate structure. Therefore it is best if the water which is used for water-leaching contains a small amount of $Li^+$ (say, at least about 80 ppm) as this prevents total removal of $Li^+$ from the aluminate structure.

It is believed that the greater the concentration of NaCl in the solution, the greater is the tendency for the crystalline aluminate structure to absorb, and hold, the $Li^+$ values. Upon water-leaching the concentration of NaCl in the interstices of the composite is reduced and as the reduction is occurring, the $Li^+$ is becoming more and more leachable from the crystal.

One of the techniques by which $Li^+$ values are removed from aqueous solution is by precipitation as lithium carbonate ($Li_2CO_3$). If other metal cations, such as alkaline earth metal cations, are present they may also precipitate as carbonates along with the lithium. Sodium carbonate does not precipitate with the lithium carbonate, therefore NaCl in the $Li^+$ solution does not pose the same contamination problems as the other metal cations. Furthermore, if NaCl is the only contaminant in the $Li^+$ solution, the NaCl can be crystallized by evaporation of most of the water, leaving a pure concentrated LiCl solution; this would not be possible with the alkaline earth metals.

The water used for water-leaching the $Li^+$ from the aluminate structure in the composite should be substantially devoid of other metal cations (such as alkaline earth metal cations) except that a small amount of $Li^+$ should be present, for purposes stated supra. Also a small amount of other alkali metal cations, such as $Na^+$ may be tolerated. De-ionized (softened) water may be used as well as distilled water or other reasonably pure water, so long as there is no substantial amount of alkaline earth metal or other non-alkali metal cations present.

The following examples are given to illustrate certain embodiments, though the invention is not limited to the particular embodiments illustrated.

In the following examples, the water-leaching step is performed using de-ionized water containing about 68 ppm $Li^+$ ions. The crude (impure) $Li^+$-containing feed brine from which $Li^+$ ions are to be extracted is a mineral brine from the Smackover deposit near Magnolia, Arkansas which was substantially saturated with NaCl and which contained, nominally about 280 ppm $Li^+$ ions, about 6.2% $Na^+$, about 17.05% $Cl^-$, about 0.41% $K^+$, about 0.31% $Mg^{++}$, about 3.3% $Ca^{++}$, about 0.23% $Sr^{++}$, about 0.022% $B^{+++}$, about 20-30 ppm $Mn^{++}$, about 20-30 ppm $Mo^{++}$, and about 9-10 ppm $Cu^{++}$; its pH was about 5.8. The substantially pure NaCl brine used as a pre-wash before water-leaching was saturated, contained about 200 ppm $Li^+$ ions, and was about 6.3 pH. The resin/aluminate composite was a weak base anion exchange resin, available commercially from The Dow Chemical Company under the tradename DOWEX MWA-1, into which had been incorporated crystalline $LiCl.2Al(OH)_3$ in accordance with the references identified supra. The vessel employed was a glass ion exchange column of 120 cc volume which was jacketed for temperature control by circulating fluid.

EXAMPLE 1

The ion exchange column was filled with the resin/aluminate composite which had been water-leached to substantially "unload" the composite with respect to its $Li^+$ content. At a temperature of about 77° C. and a flow rate of 10 cc/min. the crude feed brine was passed through the composite bed until the total hardness ($Mg^{++}$, $Ca^{++}$, etc.), as determined by standard versene method, was the same entering and leaving the column. Then a relatively pure saturated NaCl brine pre-wash was used to displace the crude feed brine remaining in the interstices of the composite; the pre-wash was passed through at 3.3 cc/min. until the amount of hardness in the effluent was less than 0.002 M. Following that the water-leaching step was done, using water flow at 3.3 cc/min.

The effluent from the column was taken as cuts for analysis of density, molar hardness, and ppm $Li^+$. Table I demonstrates the elution pattern for one cycle of loading/brine wash/leaching. It will be readily understood by persons skilled in these arts that the "unloaded" composite may be employed in numerous such cycles.

TABLE I

| Effluent Cuts No. | Vol, cc | Density g/cc | Hardness Molar | $Li^+$ ppm | Remarks |
|---|---|---|---|---|---|
| 1 | 50 | 1.137 | — | — | "Feed" brine in |
| 2 | 50 | 1.186 | — | — | |
| 3 | 50 | 1.182 | — | — | |
| 4 | 48 | 1.190 | 1.144 | — | |
| 5 | — | — | — | — | |
| 6 | — | — | — | — | |
| 7 | — | 1.207 | 1.156 | — | begin brine wash |
| 8 | 50 | — | 1.076 | — | |
| 9 | 25 | 1.162 | 0.504 | — | |
| 10 | — | 1.144 | — | — | |
| 11 | 25 | 1.146 | 0.032 | 270 | |
| 12 | 25 | — | 0.012 | 210 | |
| 13 | 25 | — | 0.002 | 190 | |
| 14 | 25 | — | — | 170 | |
| 15 | 25 | — | — | 150 | begin water-leach |
| 16 | 25 | — | — | 145 | |
| 17 | 25 | — | — | 115 | |
| 18 | 25 | — | — | 100 | |
| 19 | 25 | — | — | 1324 | |
| 20 | 25 | — | — | 1375 | |
| 21 | 25 | — | — | 675 | |
| 22 | 25 | — | — | 490 | |
| 23 | 25 | — | — | 385 | |
| 24 | 25 | — | — | 320 | |
| 25 | 25 | — | — | 290 | |

The peak cuts (19-24) contained very little hardness, if any.

EXAMPLE 2 (COMPARATIVE EXAMPLE)

This example demonstrates the effect of omitting the NaCl pre-wash of the present invention. The procedure of Example 1 above is substantially followed except that the exchange column bed was 170 cc volume, the resin composite contained a higher loading of the $LiCl.2Al(OH)_3$ crystalline material such as prepared substantially in accordance with our copending Ser. No. 095,961 (identified supra), the temperature of the column was 90° C., the flow rate was 2.5% of bed volume per minute, and the water-wash contained about 60 ppm $Li^+$. After passing enough of the Smackover brine through the resin/aluminate composite to "load" the composite with $Li^+$ values, the water-leaching step was conducted without a NaCl solution pre-wash. As can be seen from the data in Table II below, the "peak" cuts for $Li^+$ concentration contained a substantial amount of hardness values.

TABLE II

| Effluent Cuts No. | Vol. | Molar Hardness | ppm $Li^+$ | Remarks |
|---|---|---|---|---|
| 1 | 50 | 1.29 | 350 | water-leaching |
| 2 | 10 | 1.29 | 350 | |
| 3 | 10 | 1.30 | 350 | |
| 4 | 10 | 1.31 | 350 | |
| 5 | 5 | 1.29 | 350 | |
| 6 | 5 | 1.29 | 400 | |
| 7 | 5 | 1.34 | 450 | |
| 8 | 5 | 1.32 | 700 | |
| 9 | 5 | 1.14 | 2700 | |
| 10 | 5 | 0.75 | 6250 | |
| 11 | 5 | 0.42 | 7600 | |
| 12 | 5 | 0.24 | 6900 | |
| 13 | 5 | 0.14 | 6000 | |
| 14 | 5 | 0.07 | 5000 | |
| 15 | 5 | 0.06 | 4350 | |
| 16 | 5 | 0.05 | 3800 | |

TABLE II-continued

| Effluent Cuts No. | Vol. | Molar Hardness | ppm Li+ | Remarks |
|---|---|---|---|---|
| 17 | 5 | 0.03 | 3300 | |
| 18 | 5 | 0.02 | 300 | |

EXAMPLE 3

This example is run substantially as in Example 1. The smackover brine was pumped down-flow through the 120 cc bed of lithium chloroaluminate in DOWEX MWA-1 resin until the effluent contained the same concentration of Li+ as the feed; this was tested by standard atomic absorption methods. A pre-wash of pure, saturated NaCl brine was passed through the bed at a flow rate of 2.75% of bed volume per minute and the effluent collected in cuts. After about 0.83 bed volumes of the pre-wash, the bed was flushed with deionized water containing 280 ppm Li for 1.66 bed volumes and the effluent collected in cuts. Then the flow of Smackover brine was resumed at a flow rate of 8.2% bed volumes per minute to recharge or "reload" the resin composite with lithium. Table III shows the elution data.

TABLE III

| Effluent Cuts No. | Vol. cc | Molar Hardness | Li+ ppm | Remarks |
|---|---|---|---|---|
| 1 | 10 | 1.128 | 302 | Sat'd. NaCl Pre-wash |
| 2 | 10 | | 367 | |
| 3 | 10 | | 375 | |
| 4 | 10 | | 377 | |
| 5 | 10 | 1.148 | 377 | |
| 6 | 10 | 1.020 | 376 | |
| 7 | 10 | 0.670 | 424 | |
| 8 | 10 | 0.432 | 408 | |
| 9 | 10 | 0.272 | 506 | |
| 10 | 10 | 0.188 | 532 | |
| 11 | 10 | 0.144 | 511 | Begin water wash (280 ppm Li+) |
| 12 | 10 | 0.108 | 527 | |
| 13 | 10 | 0.072 | 513 | |
| 14 | 10 | 0.036 | 496 | |
| 15 | 10 | 0.048 | 479 | |
| 16 | 10 | 0.028 | 315 | |
| 17 | 10 | 0.072 | 1650 | |
| 18 | 10 | 0.052 | 4975 | |
| 19 | 10 | 0.028 | 4275 | |
| 20 | 10 | 0.020 | 3575 | |
| 21 | 10 | — | 2825 | |
| 22 | 10 | 0.012 | 2425 | |
| 23 | 10 | 0.002 | 2075 | |
| 24 | 10 | 0.006 | 1800 | |
| 25 | 10 | — | 1525 | |
| 26 | 10 | — | 1375 | |
| 27 | 10 | — | 1250 | |
| 28 | 10 | — | 1175 | |
| 29 | 10 | — | 1075 | |
| 30 | 10 | 0.006 | 992 | |
| 31 | 10 | 0.004 | 971 | Begin filtered Smackover brine |
| 32 | 10 | 0.008 | 1000 | |
| 33 | 10 | 0.008 | 928 | |
| 34 | 10 | 0.008 | 793 | |
| 35 | 10 | 0.184 | 383 | |
| 36 | 10 | 0.368 | 138 | |
| 37 | 10 | 0.496 | 45 | |
| 38 | 10 | 0.640 | 34 | |
| 39 | 10 | 0.736 | 28 | |
| 40 | 10 | 0.816 | 24 | |

Of the above cuts, 18–21 were taken as the product cut, having about 3912 ppm Li+ and low hardness. The remaining cuts were used as follows, most of them being used in a concentrating cycle, which data is shown in Table IV below.

Cuts 1-6 were recycled back to the feed tank. Cuts 7, 8, 9 were combined and flowed through a resin/aluminate bed to "load" and the Li+ into the resin. Cuts 10-13 were combined and passed through the resin bed. Cuts 14-15 were combined and passed through the resin bed. Then 33 cc of fresh make-up brine was passed through to replace portions of cuts 7-15 which had been lost or taken out through samplings. Cuts 16, 17 were combined, saturated with NaCl, and passed through the bed. Cuts 18-21 were saved as product samples. Cuts 22-23 were combined and then passed through the bed. A make-up quantity (34 cc) of 280 ppm Li+ D.I. water was passed through the bed. The data are in Table IV.

TABLE IV

| Effluent Cuts No. | Vol. cc | Molar Hardness | Li+ ppm | Remarks |
|---|---|---|---|---|
| 1 | 10 | 1.120 | 350 | Previous cuts through bed |
| 2 | 10 | — | 392 | |
| 3 | 10 | 1.164 | 401 | |
| 4 | 10 | — | 408 | |
| 5 | 10 | 1.132 | 413 | |
| 6 | 10 | — | 429 | |
| 7 | 10 | 0.888 | 447 | |
| 8 | 10 | 0.700 | 471 | |
| 9 | 10 | 0.524 | 514 | |
| 10 | 10 | 0.380 | 533 | |
| 11 | 10 | 0.296 | 565 | |
| 12 | 10 | 0.232 | 565 | |
| 13 | 10 | 0.164 | 579 | |
| 14 | 10 | 0.128 | 571 | |
| 15 | 10 | 0.080 | 575 | |
| 16 | 10 | 0.064 | 564 | |
| 17 | 10 | 0.052 | 573 | |
| 18 | 10 | 0.076 | 731 | |
| 19 | 10 | 0.100 | 3950 | |
| 20 | 10 | 0.052 | 5440 | Cuts 20-23 taken as product cuts, combined, had 4360 ppm. Li+ |
| 21 | 10 | 0.028 | 4675 | |
| 22 | 10 | 0.024 | 3925 | |
| 23 | 10 | 0.016 | 3400 | |
| 24 | 10 | 0.012 | 2900 | |
| 25 | 10 | 0.016 | 2575 | |
| 26 | 10 | 0.008 | 2325 | |
| 27 | 10 | 0.008 | 2250 | |
| 28 | 10 | 0.008 | 2075 | |
| 29 | 10 | 0.008 | 2000 | |
| 30 | 10 | 0.248 | 814 | |
| 31 | 10 | 0.472 | 346 | |
| 32 | 10 | 0.612 | 178 | |

EXAMPLE IV

For this test, to show further concentrating of Li+ values by performing a multiple number of absorptions and desorptions of the Li+ values, selected cuts are taken from the cuts shown in Table IV above.

This preferred method of operating, then, involves utilizing portions of the effluent in succeeding runs. This could be accomplished by storing the effluent in a coil or a succession of tanks to approximate the gradients. Thus the only "new" feed needed for each elution cycle would be a make-up amount of fresh de-ionized water (containing a small amount of Li+), equivalent in volume to the product cut, and enough NaCl to resaturate a portion of the gradient to be called "reflux". By successive operations, using Li-containing cuts from prior runs, the concentration of the product is increased above that possible in a single cycle.

Referring to the cuts of Table IV above, the first 6 cuts, being relatively high in hardness and low in Li, are re-cycled back to the Smackover brine feed. Cuts 7,8,9 are combined and are used as the first solution pumped into a column to elute an equivalent volume of Smackover brine. Cuts 10,11,12 are combined and pumped through after the 7,8,9 mixture. This is then followed with a solution made by mixing 13, 14, 15, 16; then 17, 18, 19 are re-saturated with NaCl and pumped into the column. Cuts 20, 21, 22, 23 were saved as product. Cuts 24, 25, 26, 27, 28, 29 and 30 were combined to follow the "reflux" mixture of 17, 18, 19. Next a volume of 280 ppm Li+ D.I. water (equivalent to volume of product cuts) follows the 24–30 cut mixture. The effluent for all this was collected in cuts as before to use in a subsequent concentrating cycle. This procedure was followed until by the fifth cycle the product cut had increased from 3912 ppm Li+ (1st cycle) to 5531 ppm Li+ (5th cycle), with little or no increase in total hardness.

We claim:

1. A method for leaching Li+ values from a macroporous resin/aluminate composite which contains contaminated brine, said resin/aluminate composite comprisng an anion exchange resin having crystalline LiX.2Al(OH)$_3$ dispersed therein, where X is halide, and being substantially loaded with respect to Li+ values, said method comprising a pre-wash of the composite with a substantially pure contaminant free, concentrated alkali metal halide solution to substantially wash the contaminated brine from the composite without significantly removing Li+ values, and water-leaching the substantially pure alkali metal halide solution and a substantial amount of Li+ values from the composite, leaving the composite substantially unloaded, but not completely unloaded, with respect to Li+ values.

2. The method of claim 1 wherein the concentrated alkali metal halide solution used for the pre-wash contains a minor amount of Li halide.

3. The method of claim 2 wherein the alkali metal halide solution is NaCl solution.

4. The method of claim 3 wherein the NaCl solution is saturated.

5. The method of claim 2 wherein the alkali metal halide solution, which contains a minor amount of Li halide, is prepared by adding NaCl to at least a portion of the eluate from the water-leaching step of a previous loading-unloading cycle.

6. The method of claim 5 wherein the NaCl solution is saturated.

7. The method of claim 2 in which the Li halide is derived from the pre-wash step and/or the water-leaching step of at least one previous loading-unloading cycle.

8. The method of claim 1 wherein the alkali metal halide solution is sodium chloride.

9. The method of claim 8 wherein the concentration of the sodium chloride solution is in the range of about 20% to about 26%.

10. The method of claim 1 wherein X is chloride.

11. The method of claim 1 wherein the alkali metal halide solutions is saturated.

12. The method of claim 1 wherein the water used for the water-leaching contains at least about 80 ppm Li+.

13. The method of claim 1 wherein the substantially unloaded composite is reloaded with Li+ values by being contacted with a Li+-containing contaminated brine.

* * * * *

UNITED STATES PATENT AND TRADEMARK OFFICE
CERTIFICATE OF CORRECTION

PATENT NO. : 4,376,100
DATED : March 8, 1983
INVENTOR(S) : John M. Lee and William C. Bauman It is certified that error appears in the above—identified patent and that said Letters Patent is hereby corrected as shown below:

Col. 5, line 10; "smackover" should be --Smackover--.

Col. 6, line 5; delete the word "and" from this sentence.

Col. 7, line 23, Claim 1; "comprisng" should read --comprising--.

Col. 8, line 27, Claim 11; "solutions" should read --solution--.

Signed and Sealed this

Fifth Day of July 1983

[SEAL]

Attest:

Attesting Officer

GERALD J. MOSSINGHOFF
Commissioner of Patents and Trademarks